July 4, 1967  C. H. FULLER  3,329,324
PIPE CARRIER ATTACHMENT
Filed Dec. 21, 1965  3 Sheets-Sheet 1

INVENTOR.
CHARLES H. FULLER,
BY
Berman, Davidson & Berman
ATTORNEYS.

July 4, 1967
C. H. FULLER
3,329,324
PIPE CARRIER ATTACHMENT
Filed Dec. 21, 1965
3 Sheets-Sheet 3
FIG. 4.
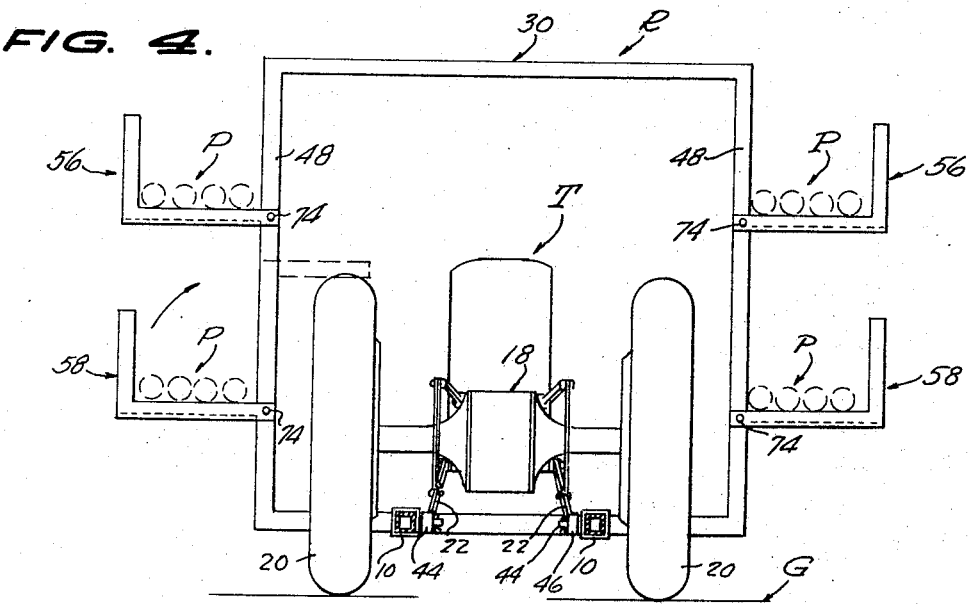
FIG. 5.
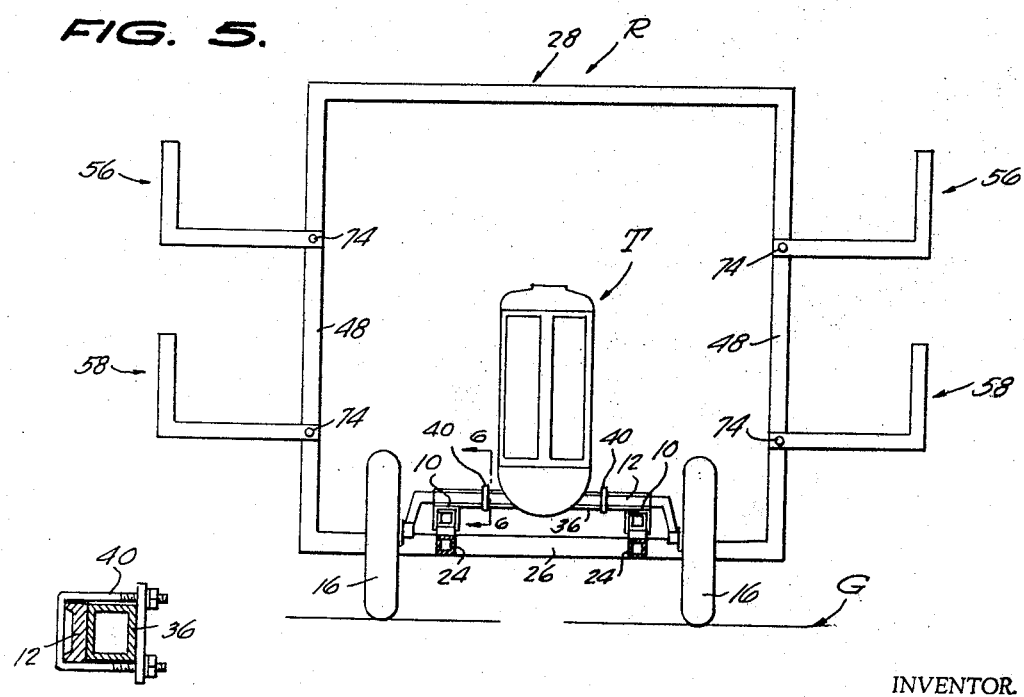
FIG. 6.
INVENTOR.
CHARLES H. FULLER,
BY
*Berman, Davidson & Berman*
ATTORNEYS.

3,329,324
PIPE CARRIER ATTACHMENT
Charles H. Fuller, St. Ignatius, Mont.
(Hot Springs, S. Dak. 57747)
Filed Dec. 21, 1965, Ser. No. 515,333
8 Claims. (Cl. 224—42.45)

This invention relates to a carrier attachment for vehicles, and more particularly to a carrier rack adapted to be separably mounted on a farm tractor, for carrying irrigation pipe and the like.

At present, in the irrigation of fields, lengths of overhead irrigation pipe, up to about forty feet in length, must be carried over irregular ground, to the sites of installation, either manually, or by the use of tractor-drawn trailers, at substantial expenditures of time, fuel, and onerous labor, which could better be used in other work. Further, the use of tractor-drawn trailers for the purpose involves difficulties in passing through field gates, taking turns on narrow roads, and maneuvering relative to work sites, because of the cumbersomeness and relatively great length of the arrangement, and the arduousness of loading and unloading pipe therefrom.

The primary object of the invention is the provision of a pipe carrier attachment for tractors, which is adapted to be supported lengthwise on a tractor, and which provides pipe carrier cradles, at opposite sides of the tractor, whereby a relatively compact unitary arrangement is provided, which is as easily and conveniently maneuverable as the tractor itself, and which is capable of carrying large amounts of pipe at a time.

Another object of the invention is the provision of a simple and inexpensive pipe carrier attachment of the character indicated above, which extends forwardly and rearwardly relative to a tractor, and is longitudinally centered relative thereto, the forepart of the attachment being supported on the front axle of the tractor, with the rear part of the attachment supported by the rear lift arms of the tractor, the attachment being readily applied to and removed from the tractor.

Figure 2:
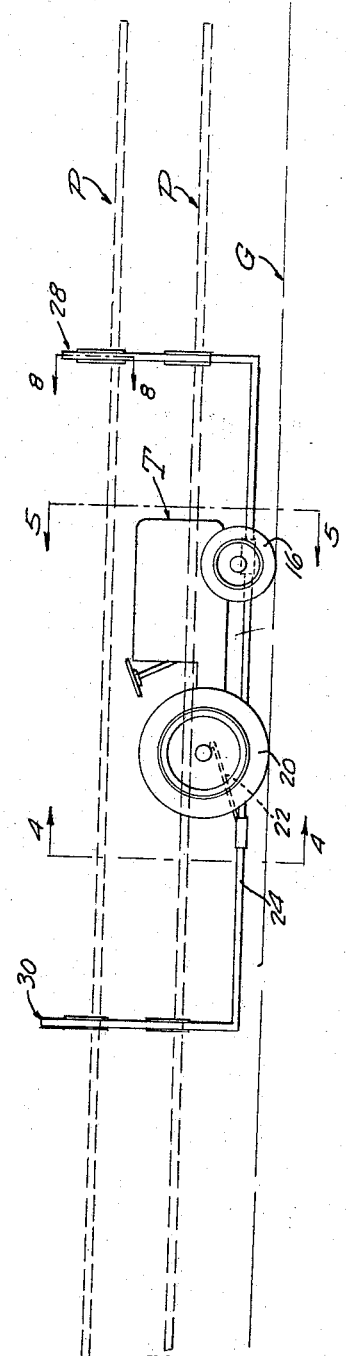
FIGURE 2 is a side elevation of FIGURE 1.
Figure 3:
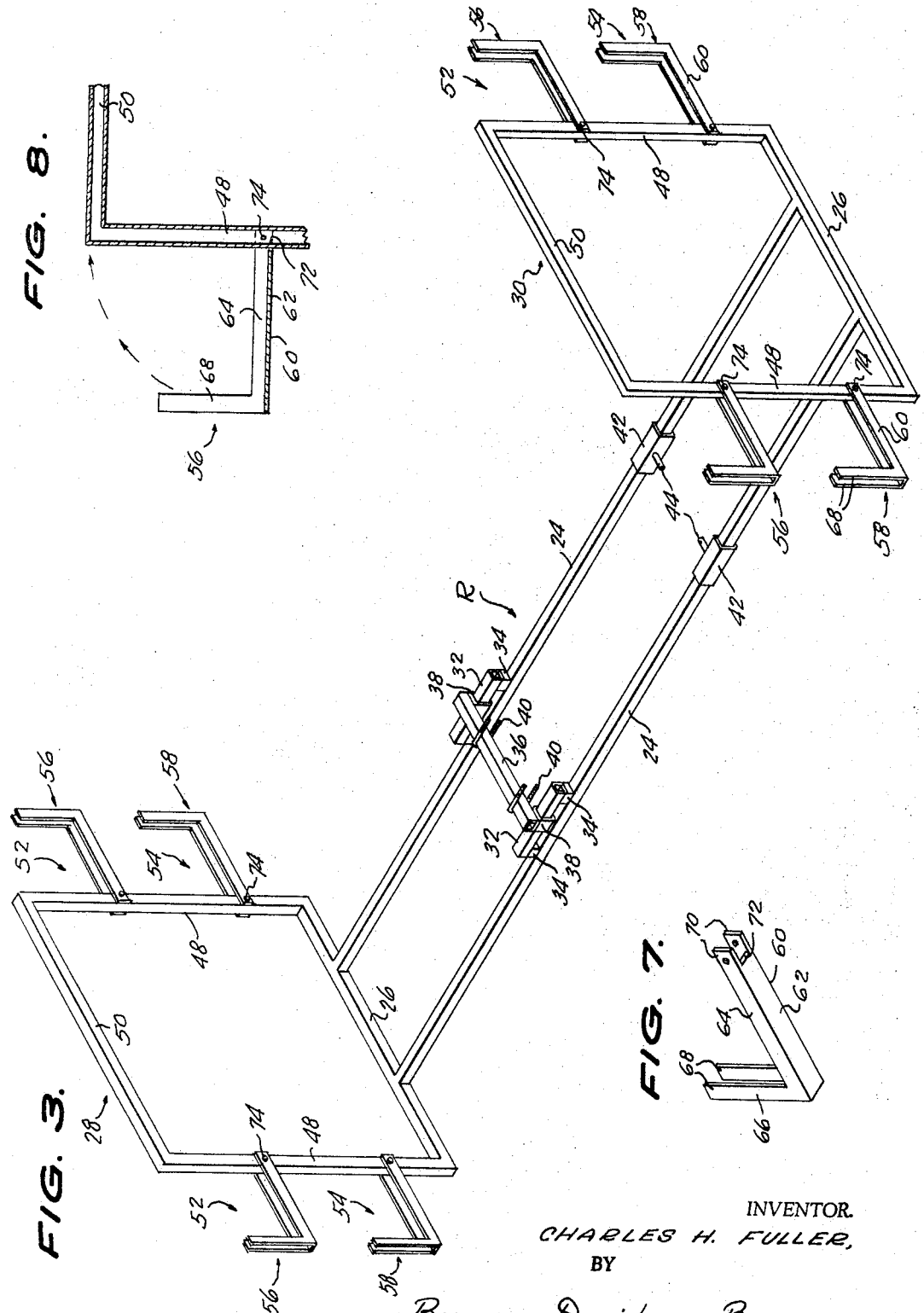
FIGURE 3 is an enlarged perspective view of the attachment, per se, showing the pipe cradle brackets in their operative positions.

FIGURES 4 and 5 are enlarged vertical transverse sections, taken on the lines 4—4 and 5—5, respectively, of FIGURE 2;

FIGURE 6 is an enlarged vertical section, taken on the line 6—6 of FIGURE 5;

FIGURE 7 is a perspective view of a pipe cradle bracket; and,

FIGURE 8 is an enlarged fragmentary vertical section, taken on the line 8—8 of FIGURE 2.

Referring in detail to the drawings, a conventional farm tractor T is shown, which involves horizontal, laterally spaced chassis frame side members 10, a transverse horizontal front axle 12, fixedly mounted to the side members 10, and carrying steeerable front wheels 16, and a transverse rear axle assembly 18, having rear drive wheels 20. From the rear of the tractor T extend laterally spaced hydraulic lift arms 22, shown in rearwardly declining positions. A pipe carrier rack R is mounted on the tractor front axle 12, and on the lift arms 22.

The rack R is longer and wider than the tractor T, and comprises a pair of substantially parallel spaced longitudinally elongated beams 24, which extend the full length of the rack, and are suitably fixed, at their forward and rear ends, to the lower horizontal cross members 26, of similar perpendicular upstanding transverse front and rear rectangular frames 28 and 30, respectively.

At locations nearer to the forward ends of the beams 24, than to their rear ends, the beams 24 have fixed thereon relatively short longitudinal members, preferably in the form of rectangular tubular bars 32, the bars 32 being upwardly spaced from the beams, as by means of longitudinally spaced blocks 34, fixed to the beams 24 and to the bars 32. A single transverse bar 36, preferably of rectangular tubular form, extends between and is centered relative to the longitudinal bars 32, and, at its ends, is suitably fixed thereon, as indicated at 38.

The transverse bar 36 is designed to engage the front side of the tractor's front axle 12, and is removably fixed thereto, as by means of U-bolts 40, embracing the front axle and the transverse bar 36, whereby the beams 24 spacedly underlie the tractor chassis side members 10, as shown in FIGURE 5.

At appropriate locations spaced rearwardly from the transverse bar 36, the rack beams 24 are provided with fixed sleeves 42, circumposed thereon, from the inner sides of which extend aligned horizontal pintles 44, on which the knuckles 46, on the rear ends of the tractor lift arms 22 are pivotally secured. As a result of this arrangement, the rack R is mounted in a horizontal position and is substantially parallel to the ground G.

The front and rear rack frames 28, 30 comprise perpendicular vertical side bars 48, upstanding on the ends of the cross members 26, the bars 48 being of rectangular cross section, and having fixed thereto, at their upper ends, upper cross members 50. The frames 28, 30 are wider than the span between the beams 24 and extend outwardly for similar distances from the beams.

Upper and lower pipe carrier cradles 52 and 54, located at the outer sides of and partially constituted by the vertical side bars 48, of the frames 28, 30, comprise similar upper and lower L-shaped brackets 56 and 58, respectively.

The brackets 56, 58 comprise, as shown in FIGURE 7, normally horizontal channel arms 60, having webs 62 and upstanding side walls 64, and right angularly related upstanding vertical arms 66, on the outer ends of the horizontal arms. The vertical arms 66 are in the form of parallel spaced vertical extensions 68 of the horizontal arm side walls 64. On the inner ends of the horizontal arms 60, their side walls 64 are longitudinally extended to provide spaced ears 70, which extend inwardly beyond the inner edges 72 of the horizontal arms 60.

Figure 1:
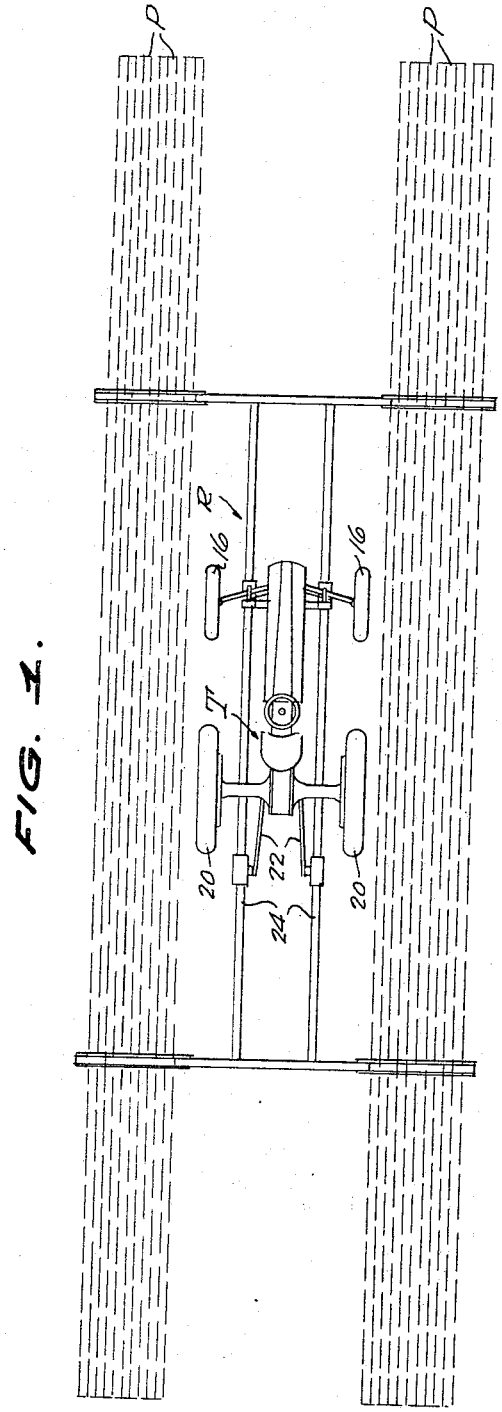
FIGURE 1 is a top plan view of a tractor equipped with an attachment of the present invention, showing pipe, in phantom lines, engaged in the cradles of the attachment.

The ears 70, of the horizontal arms 60, are engaged with opposite sides of the vertical side bars 48, of the frames 28, 30, and are traversed by pivot pins 74, which extend through the bars 48. The pins 74 are positioned relative to the inner edges 72 of the horizontal bracket arms 60, so that the bracket arms are held up in their normal horizontal operative positions by the engagement of the inner edges 72 of the webs 62, against the outer sides of the vertical frame bars 48. Pipe P are adapted to be laid endwise, as shown in FIGURE 1, on the horizontal arms 60 of the brackets 56, 58 of both frames 28, 30. The brackets 56, 58 are progressively spaced upwardly from the lower frame cross members 26, and are themselves sufficiently vertically spaced from each other to provide for easy access to the lower brackets 58. When the brackets are not in use, they are adapted to be folded upwardly and inwardly, to out-of-the-way positions, as indicated in FIGURE 8, wherein the vertical frame side bars 48 are received in the channel arms 60 and the vertical bracket arm extensions 68 are engaged with opposite sides of the upper cross members 50 of the frames.

What is claimed is:
1. In combination, a tractor having a chassis, a pipe carrier rack extending along the tractor chassis and supported thereon, the rack having pipe carrier cradle means at opposite sides of the tractor, said tractor having a transverse front axle and rearwardly extending lift arm means, the rack being severally supported on the front axle and on the lift arm means.

2. The combination of claim 1, wherein said tractor chassis has laterally spaced longitudinal side members, said rack comprising a pair of laterally spaced longitudinal horizontal beams, upstanding front and rear frames fixed on the beams adjacent related ends of the beams and extending crosswise of the beams, said beams having vertical side members spaced laterally outwardly from related beams, said vertical side members having laterally outwardly extending pipe bracket means thereon defining cradles.

3. The combination of claim 1, wherein said tractor chassis has laterally spaced longitudinal side members, said rack comprising a pair of laterally spaced longitudinal horizontal beams, upstanding front and rear frames fixed on the beams adjacent related ends of the beams and extending crosswise of the beams, said beams having vertical side members spaced laterally outwardly from related beams, said vertical side members having laterally outwardly extending pipe bracket means thereon defining cradles, said pipe bracket means comprising brackets having reclining L-shapes having horizontal members secured at their inner ends to the vertical side members and upstanding members on the outer ends of the horizontal members, the upstanding bracket members, the horizontal bracket members, and adjacent portions of the vertical frame side members constituting said pipe carrier cradle means.

4. The combination of claim 1, wherein said tractor chassis has laterally spaced longitudinal side members, said rack comprising a pair of laterally spaced longitudinal horizontal beams, upstanding front and rear frames fixed on the beams adjacent related ends of the beams and extending crosswise of the beams, said beams having vertical side members spaced laterally outwardly from related beams, said vertical side members having laterally outwardly extending pipe bracket means thereon defining cradles, said pipe bracket means comprising brackets having reclining L-shapes having horizontal members secured at their inner ends to the vertical side members and upstanding members on the outer ends of the horizontal members, the upstanding bracket members, the horizontal bracket members, and adjacent portions of the vertical frame side members constituting said pipe carrier cradle means, said horizontal bracket members being pivoted at their inner ends to the vertical frame side members to swing upwardly from outward operative positions to inward storage positions, and means for stopping the brackets in their operative positions.

5. The combination of claim 1, wherein said tractor chassis has laterally spaced longitudinal side members, said rack comprising a pair of laterally spaced longitudinal horizontal beams, upstanding front and rear frames fixed on the beams adjacent related ends of the beams and extending crosswise of the beams, said beams having vertical side members spaced laterally outwardly from related beams, said vertical side members having laterally outwardly extending pipe bracket means thereon defining cradles, said tractor having a front axle and rearwardly extending lift arm means, first means on the beams securing the beams to the front axle, and second means on the beams securing the beams to the lift arm means.

6. The combination of claim 1, wherein said tractor chassis has laterally spaced longitudinal side members, said rack comprising a pair of laterally spaced longitudinal horizontal beams, upstanding front and rear frames fixed on the beams adjacent related ends of the beams and extending crosswise of the beams, said beams having vertical side members spaced laterally outwardly from related beams, said vertical side members having laterally outwardly extending pipe bracket means thereon defining cradles, said tractor having a front axle and rearwardly extending lift arm means, first means on the beams securing the beams to the front axle, and second means on the beams securing the beams to the lift arm means, said first means comprising a transverse bar extending between and fixed to the beams, said transverse bar being engaged with a side of the front axle and secured thereto.

7. The combination of claim 1, wherein said tractor chassis has laterally spaced longitudinal side members, said rack comprising a pair of laterally spaced longitudinal horizontal beams, upstanding front and rear frames fixed on the beams adjacent related ends of the beams and extending crosswise of the beams, said beams having vertical side members spaced laterally outwardly from related beams, said vertical side members having laterally outwardly extending pipe bracket means thereon defining cradles, said tractor having a front axle and rearwardly extending lift arm means, first means on the beams securing the beams to the front axle, and second means on the beams securing the beams to the lift arm means, said first means comprising a transverse bar extending between and fixed to the beams, said transverse bar being engaged with a side of the front axis and secured thereto, said second means comprising pintle means on the beams, the lift arm means being operatively connected to the pintle means.

8. The combination of claim 1, wherein said tractor chassis has laterally spaced longitudinal side members, said rack comprising a pair of laterally spaced longitudinal horizontal beams, upstanding front and rear frames fixed on the beams adjacent related ends of the beams and extending crosswise of the beams, said beams having vertical side members spaced laterally outwardly from related beams, said vertical side members having laterally outwardly extending pipe bracket means thereon defining cradles, said pipe bracket means comprising brackets having reclining L-shapes having horizontal members secured at their inner ends to the vertical side members and upstanding members on the outer ends of the horizontal members, the upstanding bracket members, the horizontal bracket members, and adjacent portions of the vertical frame side members constituting said pipe carrier cradle means, said brackets comprising vertically spaced upper and lower brackets.

References Cited
UNITED STATES PATENTS

| | | |
|---|---|---|
| 1,527,251 | 2/1925 | Furst. |
| 2,302,502 | 11/1942 | Morkoski et al. |
| 2,499,654 | 3/1950 | Kuhlman _____ 224—42.45 |
| 2,704,162 | 3/1955 | Johnson _____ 214—1 X |
| 2,739,747 | 3/1956 | Lyszczek _____ 224—42.11 |

GERALD M. FORLENZA, Primary Examiner.

F. E. WERNER, Assistant Examiner.